July 26, 1966  D. W. CAMPBELL  3,262,139
COMBINATION TRAILER DOCK
Filed Sept. 14, 1964  4 Sheets-Sheet 3
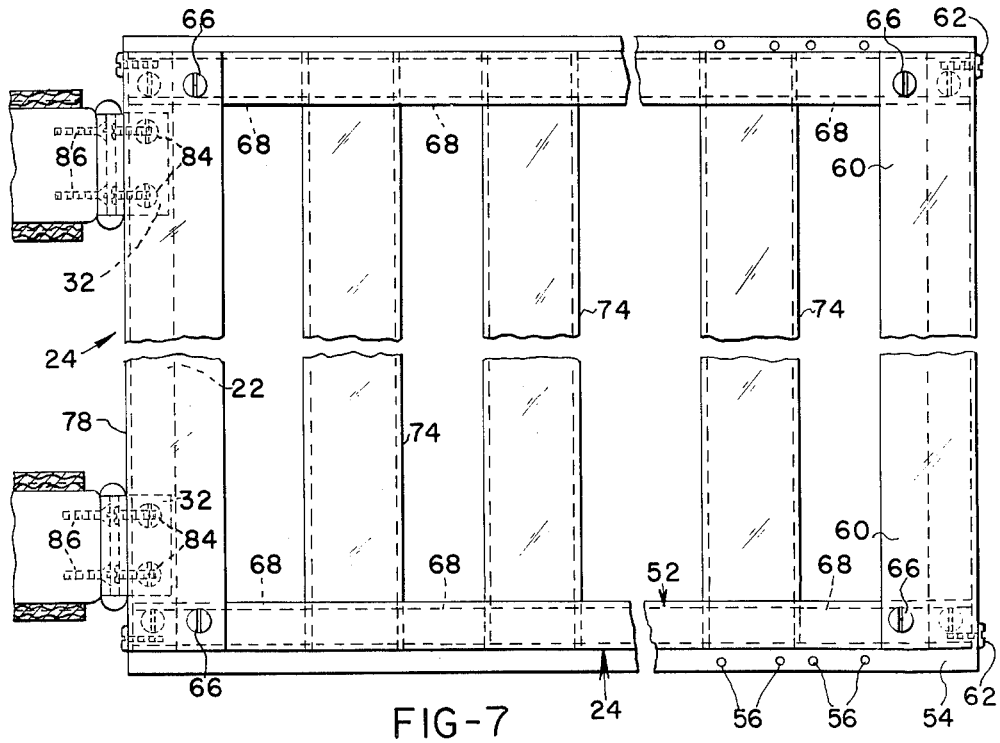
FIG-7
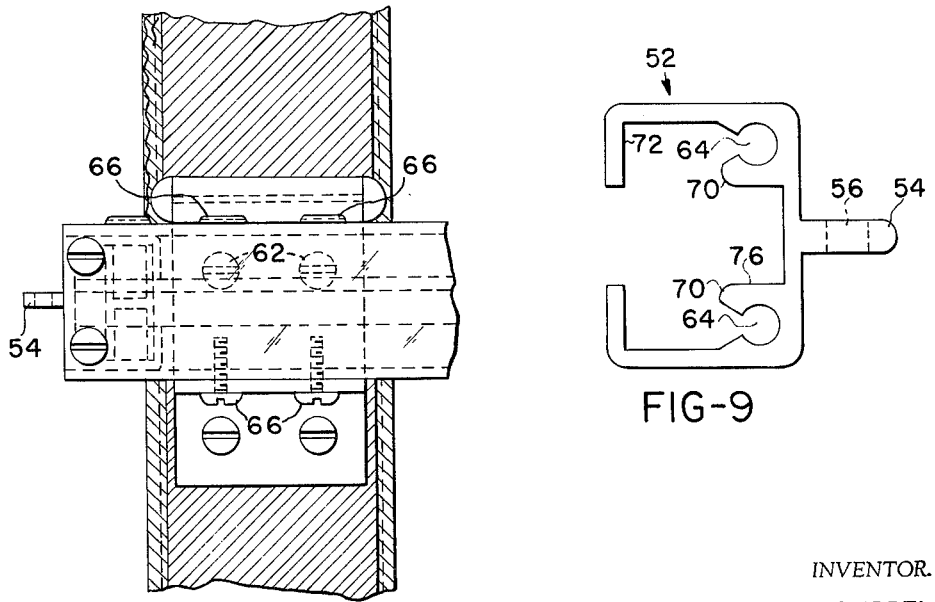
FIG-8
FIG-9
INVENTOR.
DONALD W. CAMPBELL
BY
ATTORNEYS July 26, 1966 D. W. CAMPBELL 3,262,139
COMBINATION TRAILER DOCK
Filed Sept. 14, 1964 4 Sheets-Sheet 4

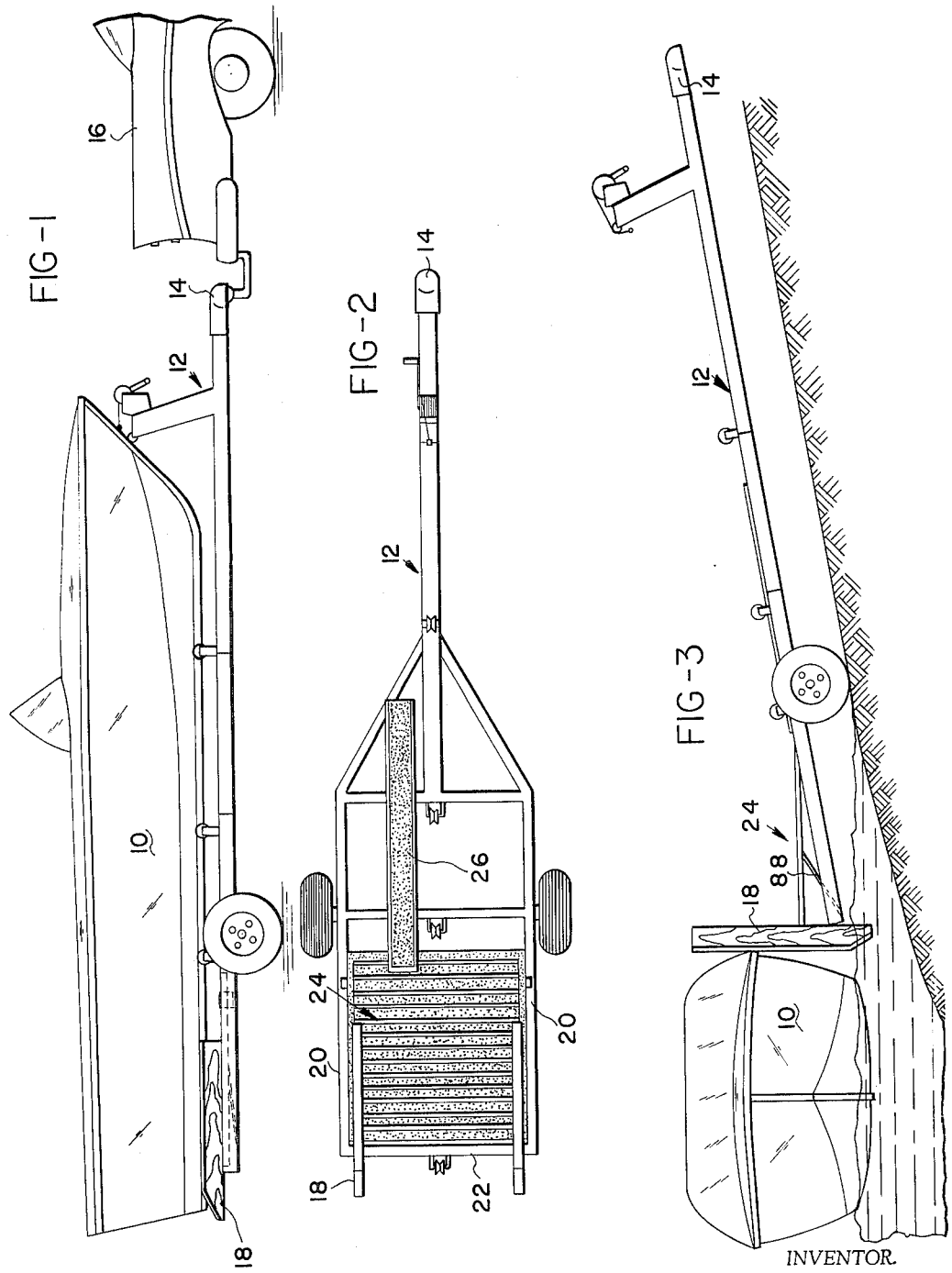

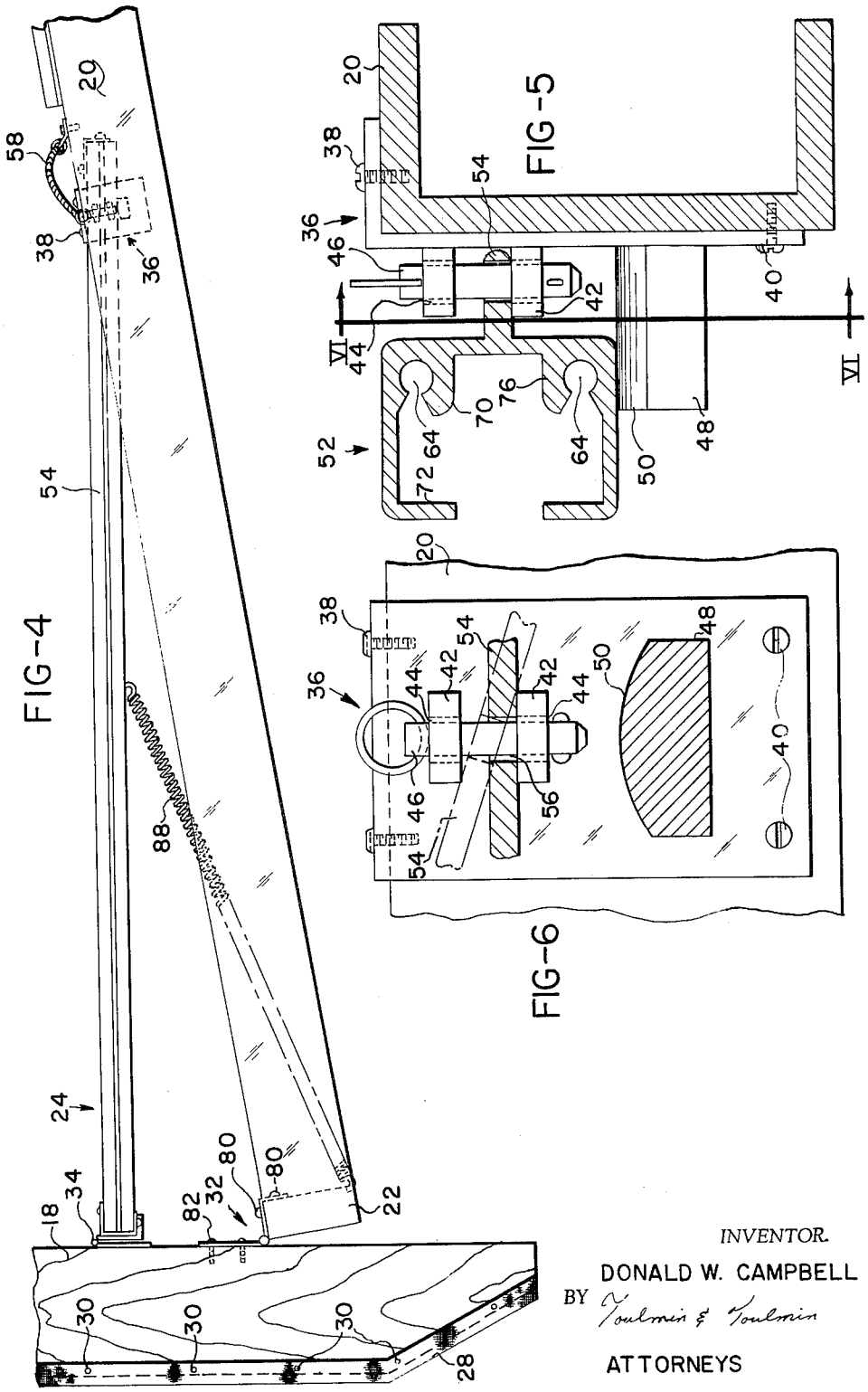

INVENTOR.
DONALD W. CAMPBELL
BY Toulmin & Toulmin
ATTORNEYS

United States Patent Office

3,262,139
Patented July 26, 1966

3,262,139
COMBINATION TRAILER DOCK
Donald W. Campbell, R.R. 2, Bellefontaine, Ohio
Filed Sept. 14, 1964, Ser. No. 396,274
7 Claims. (Cl. 9—1)

This invention relates to boat launching and is particularly concerned with an apparatus constructed on a boat trailer which apparatus may be conveniently erected to serve as a docking facility after the boat carried by the trailer is launched into the water.

Due to increased interest in motor boating activities, there are frequently not enough docking facilities available to boating enthusiasts. Usually, there is plenty of beach area from which the boats carried on trailers can be launched; however, it is not convenient to enter the boat from the beach area.

With applicant's invention, it is possible to back the trailer and boat to the water's edge at a beach area and launch the boat in the usual manner. After the boat is launched, the boat docking means of this invention is conveniently rotated into position to provide padded bolsters against which the launched boat can be tied or docked. As the bolsters rotate into a vertical position, a deck also rises up from the trailer frame to provide a platform for entering and leaving the boat. The trailer may be conveniently left secured to the towing vehicle and a convenient docking facility is thus provided.

When the boating activity is concluded, the bolsters and the deck are lowered onto the trailer and the boat may be loaded on the trailer in the usual manner. The docking means is conveniently positioned so as to not interfere with the launching or retrieving of the boat.

An object of this invention is to provide a boat launching trailer with means for providing a docking facility at the rear end of the trailer.

Another object of the invention is to provide boat decking facilities on the rear end of a trailer which will not interfere with the normal launching and retrieving of the boat from the water.

A further object of this invention is to provide boat docking means which are economical and can be readily sold in kit form.

A still further object of this invention is to provide a docking facility which can be sold in kit form and can readily be assembled on existing boat trailers with simple hand tools.

These and other objects and advantages will become apparent upon reference to the following detailed description taken in connection with the accompanying drawings in which:

FIGURE 1 is a side view of the invention showing a boat on the combination trailer dock;

FIGURE 2 is a plan view of the trailer dock with the boat removed;

FIGURE 3 is a side view of the invention showing the bolsters and deck in the operative position when used as a dock;

FIGURE 4 is an enlarged view of a portion of FIGURE 3 showing the construction of the hinge means for the bolsters and deck;

FIGURE 5 is an enlarged cross sectional view of the means for fastening the forward end of the deck to the trailer frame;

FIGURE 6 is a front view of the fastening means taken along the lines 6—6 of FIGURE 5;

FIGURE 7 is a plan view of the deck construction of this invention;

FIGURE 8 is an end view of a portion of the deck construction of FIGURE 7 showing one bolster and hinge means;

FIGURE 9 is a cross sectional view of the extruded side rail of the deck;

Figure 10:
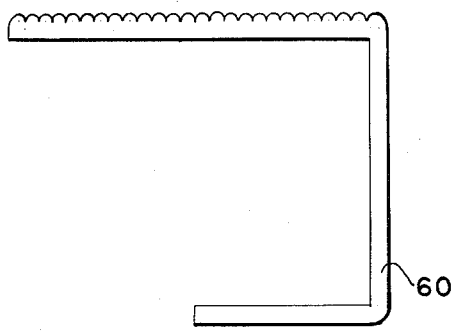
FIGURE 10 is a cross sectional view of the extruded end rail for the deck.
Figure 11:
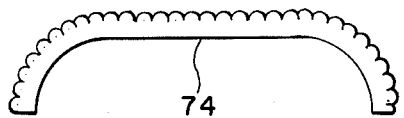
FIGURE 11 is a cross sectional view of the extruded rung for the deck.

Referring to the drawings in more detail, FIGURE 1 shows a side view of the invention with a boat 10 secured to a trailer 12 which has the usual coupling means 14 for attaching it to the towing vehicle 16. The bolster means 18 of this invention are shown at the rear of the trailer and are positioned under the boat 10 to support the boat and keep it from rocking. The particular width of the bolster means 18 can be selected to suit the particular boat being carried on the trailer.

FIGURE 2 shows a plan view of FIGURE 1 with the boat removed. In this view the trailer is seen to have side members 20 which are joined by a rear cross member 22. The deck means of this invention generally indicated 24 is shown positioned between the side members 20. A central catwalk 26 is secured to the trailer and provides a walking area to the deck means 24.

FIGURE 3 shows a side view of the invention after the boat 10 has been launched. In this view the bolster means 18 are in a generally vertical direction against which the boat may be tied. The rear end of the deck means 24 is raised to provide a generally horizontal platform for the dock. The forward end of the deck means 24 is secured to the trailer by means which will be discussed later.

After the boat is launched, the trailer 12 may be left secured to the towing vehicle 16 to anchor the trailer and docking facilities thereon. If it is necessary to remove the towing vehicle from the beach, suitable chocks can be placed under the trailer wheels and the forward end of the trailer may be secured by suitable chain means to a stake which can be driven in the ground to anchor the trailer-dock.

FIGURE 4 shows a generally enlarged view of a portion of FIGURE 3. In this view the bolster means 18 are seen to have padding 28, such as canvas or rubber, which is secured to the bolster means by tacks or nails 30. The bolster means may be generally rectangular in shape with one side pivotally secured to the cross member 22 by hinge means generally designated 32. The rear end of the deck means 24 is also pivotally secured to the bolster means 18 by hinge means 34.

The forward end of the deck means 24 is slidably received in a coupling generally designated 36 which is shown in detail in FIGURES 5 and 6. The coupling means 36 is secured to the inside and top of side members 20 by fasteners 38 and 40.

Facing toward the center of the trailer there are two spaced parallel projections 42 which have aligned apertures 44 therein to receive a coupling pin 46. At the lower end of the coupling 36 there is another projection 48 having an arcuately shaped upper surface 50 which supports the lower side of side rails 52. The side rails 52 are made from aluminum extrusions and have the general cross sectional shape shown in FIGURE 9. The side rails 52 have a projection 54 which extends for the entire length of the side rails and has apertures 56 therein.

As the bolster means 18 are rotated to the substantially vertical position shown in FIGURE 4, the projection 54 slides inside the spaced parallel projections 42 on the coupling member 36. After the bolster means assume the vertical position shown in FIGURE 4 a coupling pin 46 is inserted through the apertures 44 on the coupling member 36 and also through one of the apertures 56 on the side rails to retain the deck means 24 in the generally horizontal position shown.

In this position the forward end of the side rails 52 are supported on the projection 50 and are merely retained by the coupling pin 46 which has a suitable chain 58 to secure it to the side members 20 of the trailer. The coupling pin is a known variety, such as Waldick Ecopin. There is a similar construction for each side of the deck means to secure the forward end to the trailer.

Figure 13:
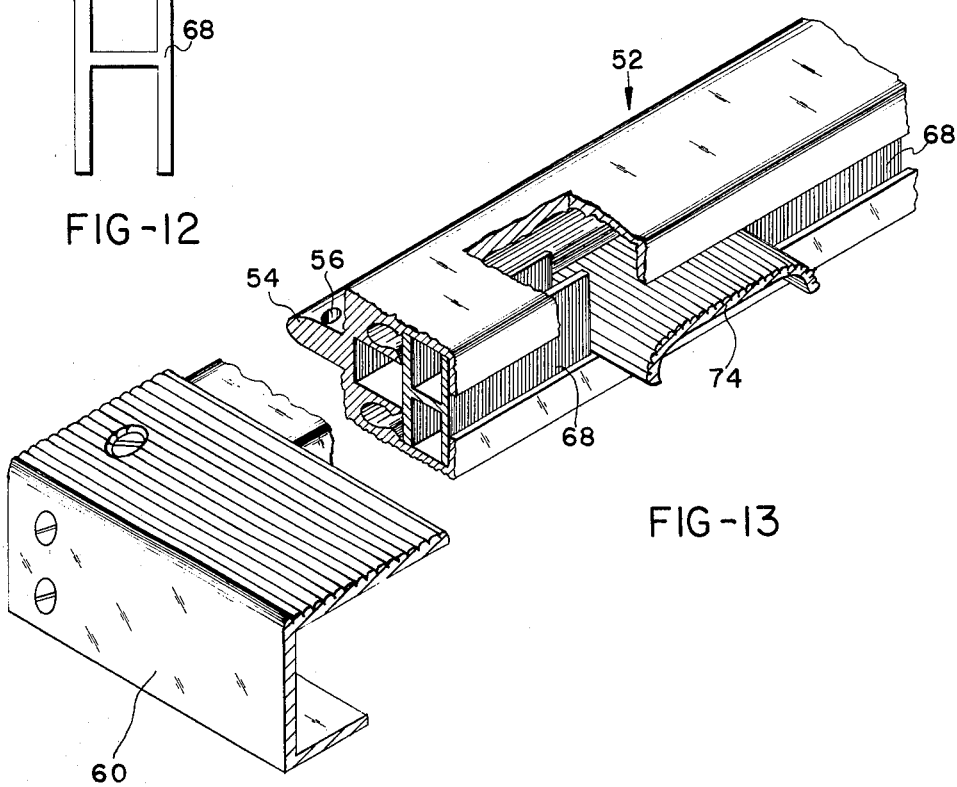
FIGURE 13 is a modified perspective view of a portion of the deck construction showing the method of assembling the various extruded members.

FIGURES 7, 8 and 13 show more details of the deck means 24. The deck means consists of side rails 52 which have the general cross sectional shape shown in FIGURE 9, as previously explained. The side rails can be cut by simple hand tool for the specific length required for the particular trailer.

An end cap member 60 is also made of extruded aluminum stock and has the cross sectional shape shown in FIGURE 10. The cap member is secured to the side rail by self-tapping fasteners 62 which fit into holes 64 of the side rails 52. Suitable holes are drilled in the top and bottom of the side rails to receive the self-tapping screws 66.

Figure 12:
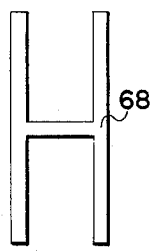
FIGURE 12 is a cross sectional view of the extruded spacer member for the deck.

Spacers 68 having the cross sectional shape shown in FIGURE 12 are also made from extruded aluminum and are inserted inside the side rails 52 and abut against the shoulder portion 70 and against the inside face 72 of the side rails.

The rung members 74 are then cut to the appropriate length by a simple hack saw and are inserted between the side tails and are supported therein on surface 76 shown in FIGURE 9. The rest of the deck means 24 is made up by inserting spacers 68 between adjacent rung members 74 until the desired length of deck is achieved. Suitable end cap member 78 which is identical to cap member 60 is then secured to the side rails in a manner similar to securing cap member 60 to the side rails.

The spacers 68 have the general cross section shown in FIGURE 12 and can be cut to whatever lengths desired to obtain the necessary spacing between the rung members 74. The upper surface of the rung member 74 may be roughened to provide a non-slip surface during the extruding of the member.

Hinge means 32 is a flat type hinge which has the general shape shown in FIGURE 4 and is secured to the cross member 22 by fasteners 80 and are also secured to the bolster means 18 by screws 82. The hinge means 34 is also a flat type hinge having the general shape shown in FIGURES 4 and 7 and is secured at the rear end of the deck means 24 by fastener means 84 and is also secured to the bolster means 18 by fastening screws 86.

In order to assist in rotating the bolster means into the generally vertical position there are coiled springs 88 which have one end secured to the cross member 22 and the other end secured to the under side of the side rails 52 as shown in FIGURE 4. The springs can be made with sufficient tension to rotate the bolster means into the vertical position as soon as the boat is removed from the trailer. Of course, the coupling pin 46 should be removed from the coupling 36 prior to launching the boat to permit the spring to take effect.

When the bolster means are in the generally horizontal position shown in FIGURE 1 the coupling pin can be inserted in one of the holes 56 in the side rails to lock the bolster means and deck means in the position shown in FIGURE 1.

The deck means shown in this invention was made out of aluminum extrusions of alloy 60–63T5; however, different materials may be used if desired. By making the deck member part out of extrusions it is possible to assemble the entire deck means with only simple hand tools, such as hacksaws, drills and screw drivers.

The apparatus of this invention can be incorporated on new trailers as they are manufactured, or the deck means with instructions for attaching to existing trailers can be sold in kit form.

It will be understood that this invention is susceptible to modification in order to adapt it to different usages and conditions and accordingly, it is desired to comprehend such modifications within this invention as may fall within the scope of the appended claims.

What is claimed is:

1. The combination comprising; a wheeled trailer having front and rear ends and adapted for transporting a boat, and boat docking means located at the rear end of said trailer and adapted to lie under the boat when the boat is on the trailer and adapted to be erected when the boat is removed and comprising; spaced bolster means pivotally connected to said rear end, deck means having front and rear ends with the rear end thereof being pivotally connected to said bolster means, and means for rigidly securing the front end of said deck means to said trailer when said bolster means are rotated into a substantially vertical position.

2. The apparatus as claimed in claim 1 further comprising spring means having one end secured to said rear end of said trailer and the other end secured to the underside of said deck means at a point between said forward and rear ends thereof to urge said bolster means into said vertical position.

3. A boat trailer dock combination comprising; a wheeled trailer having a rear end and a front end adapted to be towed, spaced bolster means located at said rear end, first hinge means pivotally joining said bolster means to said rear end for enabling said bolster means to be rotated from a horizontal position on said trailer to a substantially vertical position, deck means having a forward and rear end, second hinge means pivotally joining said bolster means to said rear end of said deck means to enable the rear end of said deck means to be raised when said bolster means are rotated to a substantially vertical position, and means for rigidly securing the forward end of said deck means to said trailer when said bolster means are rotated to the substantially vertical position.

4. The combination comprising; a wheeled trailer having front and rear ends and adapted for transporting a boat, spaced bolster means located at said rear end, each said bolster means comprising an elongated support member having padding thereon, first hinge means for each said support member being secured thereto at a point between the ends thereof and also secured to said rear end of said trailer for enabling said support members to be rotated from a horizontal position on the top of said trailer to a substantially vertical position, planar deck means having forward and rear ends, second hinge means on each said support member and secured thereto at a point above and spaced from said first hinge means and also secured to said rear end of said deck means to enable said last named end to be raised when said support members are rotated to a substantially vertical position, means rigidly interconnecting the forward end of said deck means to said trailer when said support members are rotated to a substantially vertical position, and spring means having one end secured to said rear end of said trailer and the other end secured to the underside of said deck means at a point between the forward and rear ends thereof to urge said support members into said vertical position.

5. A boat trailer dock combination comprising; a wheeled trailer having a frame with spaced side members and a cross member rigidly joining said side members at the rear of the trailer, spaced bolster means comprising an elongated support member having padding thereon, first hinge means for each said support member being secured thereto at a point between the ends thereof and also being secured to the top side of said cross member for enabling said support members to be rotated from a horizontal position on the top of said trailer to a substantially vertical position, planar deck means having forward and rear ends and adapted to lie in a first position between said side members and adapted to be moved to a second position in which said rear end is raised above said side members, second hinge means on each said support member and secured thereto at a point above and spaced from said first hinge means and also secured to the rear end of said deck means to enable said last named end to be raised when said support members are rotated to a substantially vertical position, coupling means rigidly interconnecting said side members with the forward end of said deck means when said support members are rotated to a substantially vertical position, and spring means having one end secured to said cross member and the other end secured to the underside of said deck means at a point between the forward and rear ends thereof to urge said support members into said vertical position.

6. A boat trailer dock combination comprising; a wheeled trailer having a frame with spaced side members and a cross member rigidly joining said side members at the rear of the trailer, spaced bolster means comprising an elongated support member having padding thereon, first hinge means for each said support member being secured thereto at a point between the ends thereof and also being secured to the top side of said cross member for enabling said support members to be rotated from a horizontal position on the top of said trailer to a substantially vertical position, planar deck means having forward and rear ends and adapted to lie in a first position between said side members and adapted to be moved to a second position in which said rear end is raised above said side members, said deck means comprising spaced side rails each having a projection thereon extending outwardly towards the side members of said frame, said projections having apertures therein, second hinge means on each said support member and secured thereto at a point above and spaced from said first hinge means and also secured to the rear end of said deck means to enable said last named end to be raised when said support members are rotated to a substantially vertical position, coupling means secured to each said side member and having a pair of spaced parallel projections extending toward the center of said frame with said pair of projections having aligned apertures therein to receive a coupling pin and also adapted to slidably receive the pertaining side rail therebetween, a coupling pin for each coupling means passing through said aligned apertures and one of said apertures in said projection on the side rail to secure the forward end of said deck means to said side members when said support members are rotated to a substantially vertical position, and spring means having one end secured to said cross members and the other end secured to the underside of said deck means at a point between the forward and rear ends thereof to urge said support members into said vertical position.

7. A boat trailer dock combination comprising; a wheeled trailer having a frame with spaced side members and a cross member rigidly joining said side members at the rear of the trailer, spaced bolster means comprising an elongated support member having padding thereon, first hinge means for each said support member being secured thereto at a point between the ends thereof and also being secured to the top side of said cross members for enabling said support members to be rotated from a horizontal position on the top of said trailer to a substantially vertical position, planar deck means having forward and rear ends and adapted to lie in a first position between said side members and adapted to be moved to a second position in which said rear end is raised above said side members, said deck means comprising spaced side rails each having a generally C shaped cross section with the open side extending toward the center of said frame, each said side rail also having a projection extending outwardly towards the side members of said frame with said projection having spaced apertures therein, a plurality of spaced parallel rung members extending between said side rails at right angles thereto and having their ends inserted in the open sides of the side rails, spacers retained in said side rails and positioned between said adjacent rung members and front and rear cap members having a general U shaped cross section extending between said side rails and secured thereto to retain said spacers and rung members in said side rails, second hinge means on each said support member and secured thereto at a point above and spaced from said first hinge means and also secured to the rear end of said deck means to enable said last named end to be raised when said support members are rotated to a substantially vertical position, coupling means secured to each said side member and having a pair of spaced parallel projections extending toward the center of said frame with said pair of projections having aligned apertures therein to receive a coupling pin and also adapted to slidably receive the pertaining side rail therebetween, a coupling pin for each coupling means passing through said aligned apertures and one of said apertures in said projection on the side rail to secure the forward end of said deck means to said side members when said support members are rotated to a substantially vertical position, and spring means having one end secured to said cross member and the other end secured to the underside of said deck means at a point between the forward and rear ends thereof to urge said support members into said vertical position.

References Cited by the Examiner

UNITED STATES PATENTS

| | | | |
|---|---|---|---|
| 2,336,140 | 12/1943 | Vogler | 61—48 |
| 2,676,716 | 4/1954 | Sallis | 280—414 X |
| 2,997,192 | 8/1961 | Fortune | 214—515 |
| 3,122,245 | 2/1964 | MacKusick et al. | 214—84 |
| 3,126,855 | 3/1964 | Freeburg | 9—1 X |
| 3,144,150 | 8/1964 | Cox | 214—84 X |

MILTON BUCHLER, *Primary Examiner.*

T. M. BLIX, *Assistant Examiner.*